(12) United States Patent
Doman et al.

(10) Patent No.: US 12,447,781 B2
(45) Date of Patent: *Oct. 21, 2025

(54) WEIGHT MEASURING HITCH BALL ASSEMBLY FOR MEASURING WEIGHT OF A TRAILER SUPPORTED BY A TOW VEHICLE

(71) Applicant: Weigh Safe, LLC, Lindon, UT (US)

(72) Inventors: Bryce Doman, Alpine, UT (US); Brandon Doman, Pleasant Grove, UT (US); Morgan McAllister, Lindon, UT (US)

(73) Assignee: WEIGH SAFE, LLC, Lindon, UT (US)

( * ) Notice: Subject to any disclaimer, the term of this patent is extended or adjusted under 35 U.S.C. 154(b) by 947 days.

This patent is subject to a terminal disclaimer.

(21) Appl. No.: 17/090,751

(22) Filed: Nov. 5, 2020

(65) Prior Publication Data
US 2021/0170818 A1     Jun. 10, 2021

Related U.S. Application Data

(60) Provisional application No. 62/931,108, filed on Nov. 5, 2019.

(51) Int. Cl.
*B60D 1/24* (2006.01)
*B60D 1/06* (2006.01)
(Continued)

(52) U.S. Cl.
CPC ............ *B60D 1/248* (2013.01); *B60D 1/06* (2013.01); *G01G 5/04* (2013.01); *G01G 19/10* (2013.01)

(58) Field of Classification Search
CPC . B60D 1/248; B60D 1/06; B60D 1/62; G01G 5/04; G01G 19/10
(Continued)

(56) References Cited

U.S. PATENT DOCUMENTS 245,201 A    8/1881  Mills
665,017 A    1/1901  Klein
(Continued)

FOREIGN PATENT DOCUMENTS

DE    3612053 A1    10/1987
DE    10211572 A1   10/2003
(Continued)

OTHER PUBLICATIONS

PCT Application No. PCT/US20/59202 Filing date Nov. 5, 2020 Bryce Doman International Search Report Mailing date Feb. 17, 2021. 10 Pages.
(Continued)

*Primary Examiner* — Jacques M Saint Surin
(74) *Attorney, Agent, or Firm* — Thorpe North & Western, LLP; David W. Osborne

(57) ABSTRACT

A weight measuring hitch ball assembly is described. The assembly can include a hitch ball having a ball and a lower portion. The assembly can also include a body portion defining a hitch ball opening that slidably receives the lower portion of the hitch ball. The assembly can further include a load measurement device operably associated with the body portion and the hitch ball to determine a magnitude of a force acting on the hitch ball. Additionally, the assembly can include a hitch mount interface configured to interface with an attachment structure that facilitates coupling the weight measuring hitch ball assembly to a tow vehicle.

29 Claims, 8 Drawing Sheets

(51) Int. Cl.
*G01G 5/04* (2006.01)
*G01G 19/10* (2006.01)
(58) Field of Classification Search
USPC .............................................................. 177/1
See application file for complete search history.

(56) References Cited

U.S. PATENT DOCUMENTS

| | | | |
|---|---|---|---|
| 2,500,686 A | 3/1950 | Jontz | |
| 3,695,213 A | 10/1972 | Littlefield | |
| 3,700,053 A | 10/1972 | Glissendorf | |
| 3,797,594 A | 3/1974 | Chaffee | |
| 4,056,155 A | 11/1977 | Wahl | |
| 4,239,253 A | 12/1980 | Golze | |
| 4,286,669 A | 9/1981 | Lasoen | |
| 4,319,766 A | 3/1982 | Corteg et al. | |
| 4,522,421 A | 6/1985 | Vance | |
| 4,627,633 A | 12/1986 | Gehman et al. | |
| 4,996,770 A | 3/1991 | McCracken | |
| 5,040,817 A | 8/1991 | Dunn | |
| 5,116,072 A | 5/1992 | Swenson | |
| 5,280,941 A | 1/1994 | Guhlin | |
| 5,286,094 A | 2/1994 | Milner | |
| 5,290,057 A | 3/1994 | Pellerito | |
| 5,890,726 A | 4/1999 | McCoy et al. | |
| 6,053,521 A | 4/2000 | Schertler | |
| 6,142,500 A | 11/2000 | Sargent | |
| 6,253,626 B1 | 7/2001 | Shoberg et al. | |
| 6,270,107 B1 | 8/2001 | Stoughton | |
| 6,386,789 B1 | 5/2002 | Chausse et al. | |
| 6,494,478 B1 | 12/2002 | MacKarvich | |
| 6,629,701 B1 | 10/2003 | Colibert | |
| 6,722,684 B1 | 4/2004 | McAllister | |
| 6,829,943 B2 | 12/2004 | Weyand et al. | |
| 7,960,659 B2 | 6/2011 | Cleary | |
| 7,963,545 B2 | 6/2011 | Coy | |
| 8,011,685 B2 | 9/2011 | Belinky et al. | |
| 8,033,563 B2 | 10/2011 | Good | |
| 8,226,107 B2 | 7/2012 | Columbia | |
| 8,276,932 B2 | 10/2012 | Columbia | |
| 8,371,603 B2 | 2/2013 | Columbia | |
| 8,376,387 B2 | 2/2013 | Columbia | |
| 8,380,390 B2 | 2/2013 | Sy et al. | |
| 8,534,695 B2 | 9/2013 | Columbia | |
| 8,840,130 B2 | 9/2014 | Columbia | |
| 8,939,462 B2 | 1/2015 | Adamczyk et al. | |
| 9,004,523 B2 | 4/2015 | Scharf | |
| 9,242,520 B2 | 1/2016 | Mida et al. | |
| 9,327,566 B2 | 5/2016 | Columbia | |
| 9,370,976 B2 | 6/2016 | McCoy et al. | |
| 9,464,953 B2 | 10/2016 | Wirthlin | |
| 9,643,462 B2 * | 5/2017 | McAllister | G01L 5/136 |
| 9,796,227 B2 * | 10/2017 | McAllister | G01L 3/00 |
| 10,059,160 B2 | 8/2018 | Ruiz et al. | |
| 10,106,002 B2 * | 10/2018 | McAllister | B60D 1/06 |
| 10,596,869 B2 * | 3/2020 | McAllister | G01L 5/136 |
| 10,625,547 B2 * | 4/2020 | McAllister | B60D 1/62 |
| 11,701,932 B2 | 7/2023 | McAllister | |
| 2001/0045725 A1 | 11/2001 | McCoy et al. | |
| 2002/0140207 A1 | 10/2002 | McCoy et al. | |
| 2005/0283296 A1 | 12/2005 | Viaud | |
| 2006/0032679 A1 | 2/2006 | Wilson et al. | |
| 2006/0290102 A1 | 12/2006 | VanBuskirk | |
| 2009/0107735 A1 | 4/2009 | Cleary | |
| 2009/0302574 A1 | 12/2009 | Columbia | |
| 2010/0181143 A1 | 7/2010 | Bowden | |
| 2010/0207360 A1 | 8/2010 | Columbia | |
| 2010/0332049 A1 | 12/2010 | Sy et al. | |
| 2011/0042154 A1 | 2/2011 | Bartel | |
| 2011/0259651 A1 | 10/2011 | Cleary | |
| 2012/0024081 A1 | 2/2012 | Baker | |
| 2012/0091690 A1 | 4/2012 | Tambornino | |
| 2012/0217726 A1 | 8/2012 | Vortmeyer et al. | |
| 2013/0038436 A1 | 2/2013 | Brey et al. | |
| 2013/0080078 A1 | 3/2013 | Wirthlin | |
| 2013/0127137 A1 | 5/2013 | McCoy et al. | |
| 2013/0253814 A1 | 9/2013 | Wirthlin | |
| 2014/0110918 A1 | 4/2014 | McCoy | |
| 2014/0327229 A1 | 11/2014 | Scharf | |
| 2014/0339791 A1 | 11/2014 | McCall et al. | |
| 2015/0069737 A1 | 3/2015 | McAllister | |
| 2016/0185170 A1 * | 6/2016 | McAllister | B60D 1/248 177/136 |
| 2016/0231165 A1 | 8/2016 | Fredrickson | |
| 2020/0317011 A1 | 10/2020 | McAllister | |
| 2020/0384817 A1 | 12/2020 | Anderson et al. | |
| 2021/0053404 A1 | 2/2021 | McAllister | |
| 2021/0170819 A1 * | 6/2021 | Doman | G01L 5/136 |
| 2022/0250424 A1 * | 8/2022 | McAllister | G01G 19/08 |
| 2022/0363096 A1 * | 11/2022 | Doman | B60D 1/065 |

FOREIGN PATENT DOCUMENTS

| | | |
|---|---|---|
| DE | 202011051374 U1 | 9/2011 |
| DE | 202011105552 U1 | 9/2012 |
| DE | 102011078329 A1 | 1/2013 |
| EP | 2363307 A2 | 9/2011 |
| EP | 3114440 | 3/2017 |
| WO | WO 2007/002278 A2 | 1/2007 |
| WO | WO 2017/136483 A2 | 8/2017 |

OTHER PUBLICATIONS

PCT Search Report for application No. PCT/US2022/013566, mailing date May 6, 2022, 10 pages.

* cited by examiner

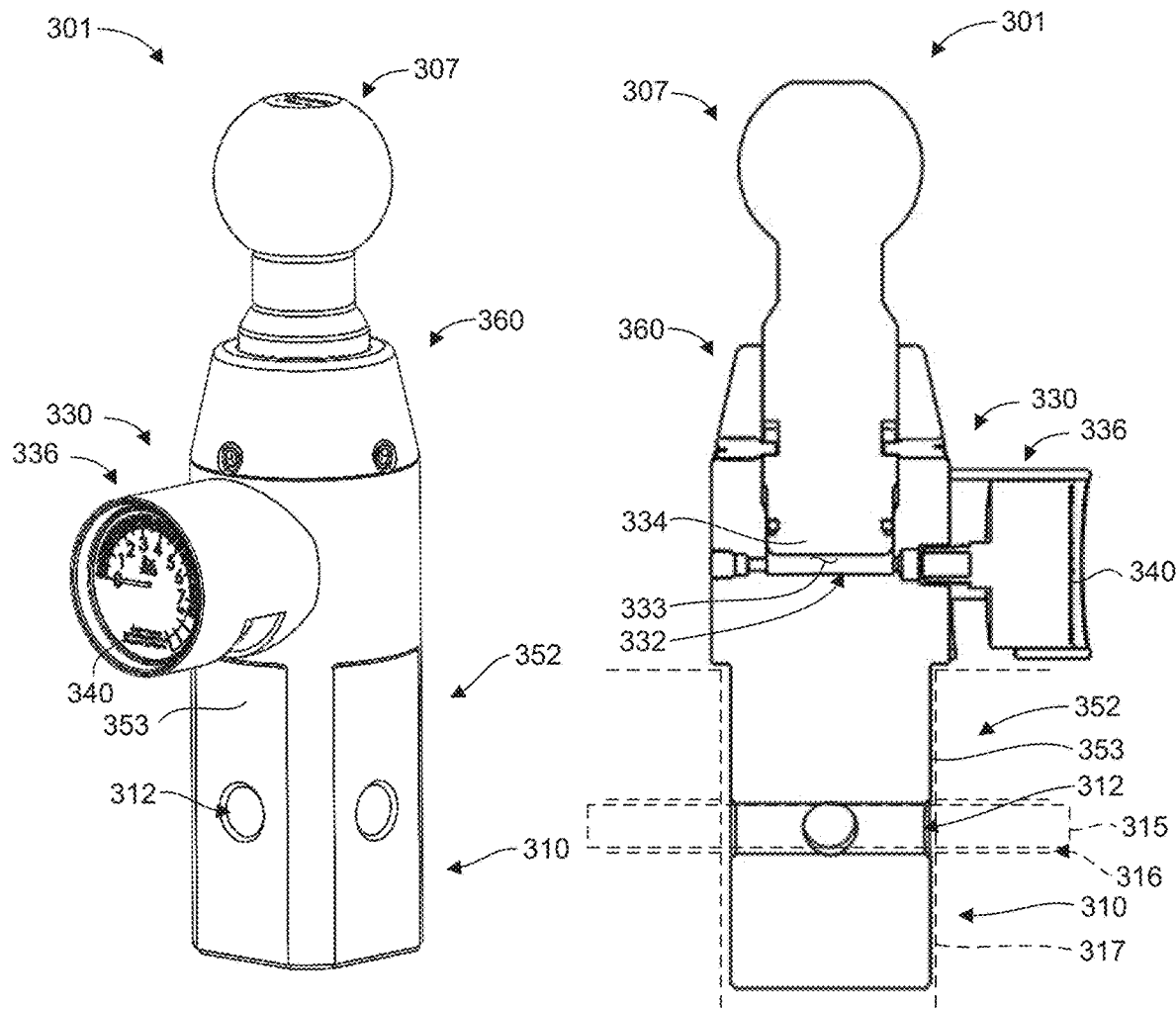
*FIG. 4A*
*FIG. 4B*
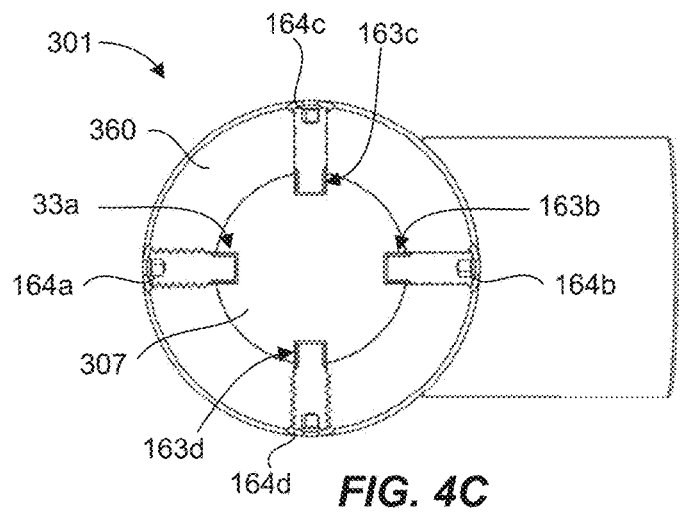
*FIG. 4C*

WEIGHT MEASURING HITCH BALL ASSEMBLY FOR MEASURING WEIGHT OF A TRAILER SUPPORTED BY A TOW VEHICLE

PRIORITY DATA

This application claims the benefit of U.S. Provisional Patent Application Ser. No. 62/931,108 filed on Nov. 5, 2019, which is incorporated herein by reference.

FIELD OF THE INVENTION

The present invention relates generally to trailer hitch devices, systems, and associated methods. Accordingly, the present invention involves the mechanical arts field.

BACKGROUND OF THE INVENTION

When towing a trailer behind a vehicle, one factor that can significantly affect safety is the hitch or tongue weight (i.e., static downward force) that the trailer applies to the hitch of the tow vehicle. If the hitch or tongue of the trailer does not apply enough downward force to the tow vehicle hitch, a dangerous condition called trailer sway could result. If the hitch or tongue of the trailer applies too much downward force to the tow vehicle hitch, then the rear tires of the tow vehicle can be overloaded, thus pushing the rear of the vehicle around and compromising steering and/or braking of the tow vehicle. A generally acceptable tongue weight for a "bumper pull" trailer is somewhere between 9% and 15% of the gross trailer weight (GTW), and a generally acceptable hitch weight for a "bed mount" (e.g., gooseneck) trailer is somewhere between 15% and 25% of the GTW.

SUMMARY OF THE INVENTION

Weight measuring hitch ball assemblies are provided. In one embodiment, a weight measuring hitch ball assembly can include a hitch ball having a ball and a lower portion. The assembly can also include a body portion defining a hitch ball opening that slidably receives the lower portion of the hitch ball. The assembly can further include a load measurement device operably associated with the body portion and the hitch ball to determine a magnitude of a force acting on the hitch ball. Additionally, the assembly can include a hitch mount interface configured to interface with an attachment structure that facilitates coupling the weight measuring hitch ball assembly to a tow vehicle.

In other embodiments, there are provided weight measuring hitch ball systems. In still other embodiments, there are provided methods of measuring weight of a trailer supported by a tow vehicle.

BRIEF DESCRIPTION OF THE DRAWINGS

FIG. 4A illustrate a weight measuring hitch ball assembly in accordance with an example of the present disclosure.

FIG. 4B is a side cross-sectional view of the weight measuring hitch ball assembly of FIG. 4A.

FIG. 4C is a top cross-sectional view of the weight measuring hitch ball assembly of FIG. 4A.

DETAILED DESCRIPTION OF THE INVENTION

Definitions

Figure 1:
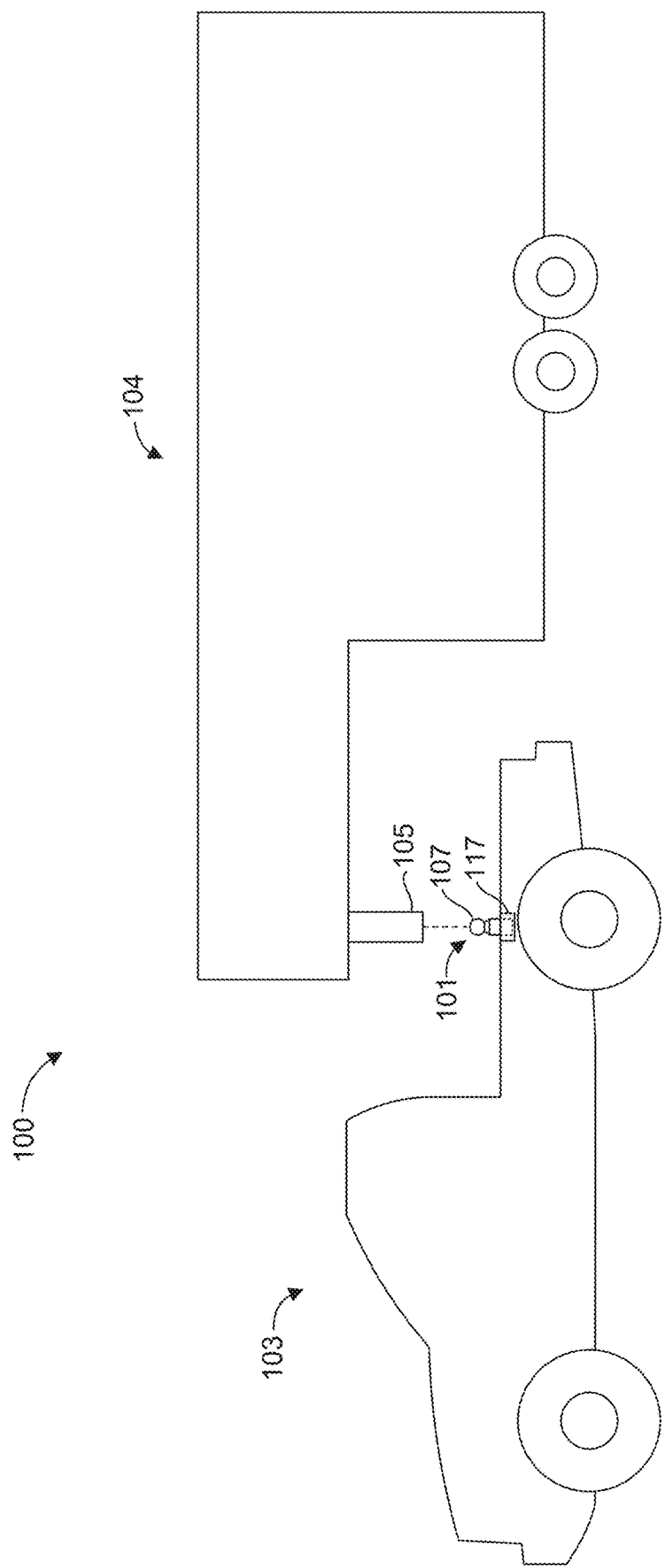
FIG. 1 illustrates a trailer hitch system for measuring a hitch weight of a trailer, in accordance with an example of the present disclosure.

In describing and claiming the present invention, the following terminology will be used in accordance with the definitions set forth below.

The singular forms "a," "an," and, "the" include plural referents unless the context clearly dictates otherwise.

As used herein, the term "about" is used to provide flexibility to a numerical range endpoint by providing that a given value may be "a little above" or "a little below" the endpoint.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term, like "comprising" or "including," it is understood that direct support should also be afforded to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects or structures described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

U.S. Provisional Patent Application Ser. Nos. 62/249,730 filed on Nov. 2, 2015, 62/325,607 filed on Apr. 20, 2016, 61/826,247 filed on May 22, 2013, 61/928,166 filed on Jan. 16, 2014, 61/948,487 filed on Mar. 5, 2014, and 61/948,456 filed Mar. 5, 2014, are each incorporated herein by reference.

U.S. patent application Ser. No. 14/639,987 filed on Mar. 5, 2015, Ser. No. 14/639,987 filed on Mar. 5, 2015, and Ser. No. 14/284,273 filed on May 21, 2014, are each incorporated herein by reference.

PCT Application Serial No. PCT/US16/21266 filed on Mar. 7, 2016, is incorporated herein by reference.

The Invention

Figure 2:
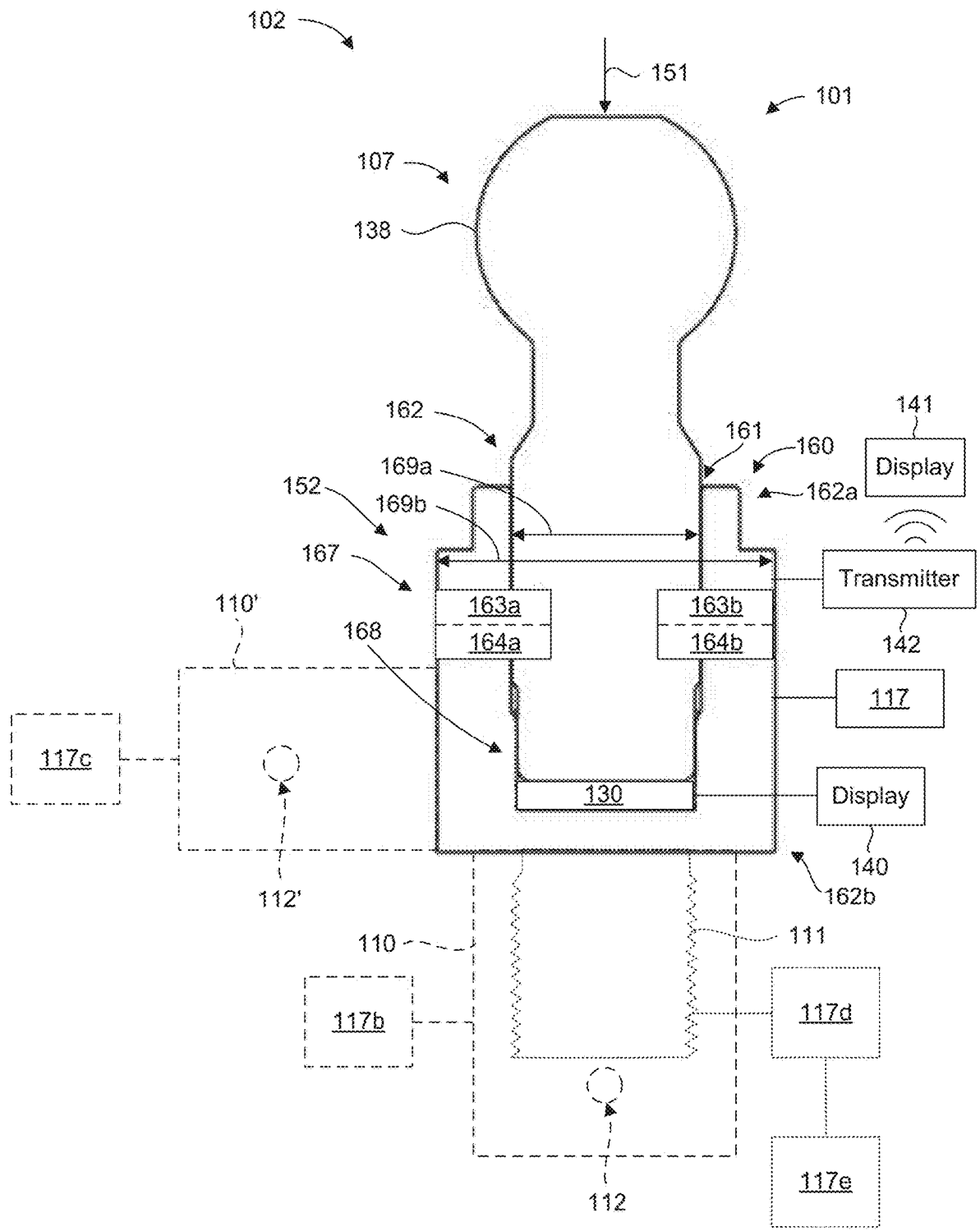
FIG. 2 illustrates a weight measuring hitch ball assembly of the trailer hitch system of FIG. 1, in accordance with an example of the present disclosure.

With reference to FIG. 1, illustrated is a trailer hitch system 100 for measuring hitch weight (e.g., ball weight, pin weight, or tongue weight) of a trailer, in accordance with an example of the present disclosure. In general, the trailer hitch system 100 can include a weight measuring hitch ball assembly 101 associated with a tow vehicle 103, and a trailer 104 operable to couple to the tow vehicle 103. A schematic illustration of the weight measuring hitch ball assembly 101 is shown in FIG. 2.

The weight measuring hitch ball assembly 101 can be included in a weight measuring hitch ball system 102, which can also include an attachment structure 117 that facilitates coupling the weight measuring hitch ball assembly 101 to the tow vehicle 103 (FIG. 1). Attachment structures are discussed in more detail below. The weight measuring hitch ball assembly 101 can include a hitch ball 107 (e.g., a goose ball, a ball mount, etc.) configured to engage with a coupling device 105 (FIG. 1) of the trailer 104 (e.g., a gooseneck, a tongue, etc.), and a load measurement device 130 (FIG. 2) operable to determine a magnitude of a downward force 151 acting on the hitch ball 107.

Although the trailer hitch system 100 includes what is generally referred to as a "hitch ball" throughout the present disclosure for coupling with a trailer, it should be recognized that the trailer hitch system can include any suitable form of coupling with a trailer, such as a lunette ring and pintle hook. Aspects of the present disclosure that facilitate measuring hitch weight of a trailer as disclosed herein can be incorporated into such coupling arrangements.

The weight measuring hitch ball assembly 101 can also include a support structure or body portion 160. The hitch ball 107 can include a ball 138 and a lower portion 162. The ball 138 can be configured to interface with a coupling device of a trailer (e.g., a trailer tongue, gooseneck, etc.). The ball 138 and the lower portion 162 can be separate and distinct structures coupled to one another (i.e., rigidly and fixedly coupled) or the ball 138 and the lower portion 162 can form a single, monolithic structure. In either case, the hitch ball 107 can be a single structure comprised of multiple component parts or portions that remain in a fixed relationship to one another.

The load measurement device 130 can be operably associated with the body portion 160 and the hitch ball 107 to determine a magnitude of the force 151 acting on the hitch ball 107 (e.g., through the trailer interface with the ball 138). For example, the body portion 160 can include or define a hitch ball opening or socket 161 to slidably receive the lower portion 162 of the hitch ball 107. The hitch ball opening 161 can be configured to constrain translational movement of the hitch ball 107 to a single degree of freedom (i.e., parallel to the downward force 151), which can facilitate the hitch ball 107 exerting a force on the load measurement device 130.

The load measurement device 130 can comprise any suitable type of load measurement device or mechanism described herein. For example, the load measurement device 130 can comprise a load cell or transducer, such as a strain gage load cell, a mechanical load cell, a hydraulic load cell, and/or a pneumatic load cell, or any other suitable type of force and/or pressure sensor. In some examples, the load measurement device 130 can comprise a force gauge, such as a spring scale. In some embodiments, the load measurement device 130 can include a piston, a hydraulic medium (e.g., a fluid), and a pressure sensor or a load gauge as described in several examples hereinabove and hereinbelow. For instance, as described in other examples disclosed herein, the load measurement device 130 can include a fluid reservoir in fluid communication with a load gauge, and the fluid reservoir can comprise at least one of a hydraulic fluid or a pneumatic fluid. In one aspect, the lower portion of the hitch ball can act against a separate piston, which in turn acts on the fluid in the fluid reservoir as a means to determine the downward force 151 acting on the hitch ball. In another aspect, a bottom 168 of the lower portion 162 of the hitch ball 107 can form a piston operable to act on fluid in the fluid reservoir. In this case, the hitch ball may act directly on the fluid in the fluid reservoir, with no intermediate structures between the hitch ball and the fluid. Thus, the hitch ball 107 may be configured with an integrally formed piston to act on the fluid. In one aspect, the body portion 160 can define various features of the load measurement device 130 in addition to interfacing with and supporting the hitch ball 107. For example, the body portion 160 can form or define, at least in part, a fluid reservoir of the load measurement device 130.

In addition, the weight measuring hitch ball assembly 101 can include a display 140 for displaying or otherwise indicating force or load information obtained by the load measurement device 130. For example, the display 140 can be configured to indicate the magnitude of the downward force, as determined by the load measurement device 130. Thus, the display 140 can be an analog and/or digital display of a sensor or load cell (e.g., a pressure gauge) located local to the load measurement device 130 and/or a separate display device distinct from the load measurement device 130 (e.g., a remote display associated with the tow vehicle and/or a mobile electronic device). The display 140 can be wired and/or wirelessly connected to the load measurement device 130. Thus, in one example, the weight measuring hitch ball assembly 101 can include a wireless transmitter, as described herein, to wirelessly transmit force measurements to a remote display.

In one aspect, the display 140 can be associated with the body portion 160, as shown in FIG. 2. The display 140 can be any suitable type of display, such as an analog or a digital display. The display 140 can be coupled to the load measurement device 130 in any suitable manner such that the display can properly indicate the magnitude of the load on the hitch ball 107. In one aspect, the display can be mechanically, electrically, hydraulically, and/or pneumatically coupled to the load measurement device 130. The load measurement device 130 and/or the display 140 can therefore include any suitable mechanical, electrical, hydraulic, and/or pneumatic device or mechanism that can facilitate the determination and/or display of the magnitude of the load on the hitch ball 107. For example, the load measurement device 130 and/or the display 140 can include a processor and/or memory to determine the magnitude of the load on the hitch ball 107. In one aspect, a mobile device, such as a smartphone or a tablet, can include a processor and/or memory used to determine the magnitude of the load on the hitch ball 107, such as by executing an application. In another aspect, the display 140 can be calibrated to indicate the magnitude of the load on the hitch ball 107, based on mechanical, electrical, hydraulic, and/or pneumatic input from the load measurement device 130. In a particular aspect, therefore, the display 140 can be integral with the load measurement device 130 in determining the magnitude of the load on the hitch ball 107.

In some examples, the weight measuring hitch ball assembly 101 can include a transmitter 142 such that load data pertaining to the magnitude of the downward force on the hitch ball 107 can be wired or wirelessly transmitted to the display 140. In one aspect, the transmitter can transmit load data to a location remote from the ball hitch, such as to a remote display 141. For example, the display 141 can be located inside the vehicle and can receive load data for display to the driver or operator of the vehicle. The transmission of load data can be via vehicle wiring, such as the taillight wiring, which can be utilized to communicate load data via a signal to the interior of the vehicle. In another aspect, a wireless transmission of load data can be accomplished via a Bluetooth connection, a cellular network, LAN, WIFI, an RF signal, an infrared signal, or any other suitable type of wireless network, connection, and/or protocol. In one aspect, the display 141 can comprise a screen of a mobile device, such as a smartphone or a tablet. Thus, the load data can be communicated to any suitable location, in or out of the vehicle. It should therefore be recognized that the display 140, 141 can be disposed in any suitable location and can be in communication with the load measurement device 130 via any suitable means. In one aspect, the load measurement device 130, the display 140, and/or the transmitter 150, or any other related item or device, such as a processor, memory, a battery, or a RF receiver, can be located in or on the weight measuring hitch ball assembly 101.

In one aspect, the weight measuring hitch ball assembly 101 of FIG. 2 can be configured to capture the hitch ball 107 to prevent the hitch ball from unwanted separation from the body portion 160. For example, the assembly 101 can include a retention coupling 167 that secures the hitch ball 107 to the body portion 160 while also facilitating slidable movement of the hitch ball 107 within the hitch ball opening 161 to determine the magnitude of the force 151 acting on the hitch ball 107. The retention coupling 167 can have one or more retention recesses 163*a-b* and one or more retention protrusions 164*a-b,* which are schematically represented in FIG. 2. The one or more retention recesses 163*a-b* can be associated with the hitch ball 107 (e.g., formed within the lower portion 162 of the hitch ball 107) and/or associated with the body portion 160 (e.g., formed within the body portion 160). The one or more retention protrusions 164*a-b* can also be associated with the hitch ball 107 (e.g., coupled to the lower portion 162 of the hitch ball 107) and/or associated with the body portion 160 (e.g., coupled to the body portion 160). Each of the retention recesses 163*a-b* can receive at least one of the retention protrusions 164*a-b* to secure the hitch ball 107 to the body portion 160. For example, the retention protrusions 164*a-b* can extend into the respective retention recesses 163*a-b*. The retention recesses 163*a-b* and the retention protrusions 164*a-b* can be configured to facilitate movement of the hitch ball 107 against the load measurement device 130 in response to the downward force 151 on the hitch ball. For example, an upper clearance between the retention protrusions 164*a-b* and the retention recesses 163*a-b* can be sized equal to or greater than a range of motion of the load measurement device 130 (e.g., maximum deflection or piston travel) in response to a maximum allowable force 151 applied to the hitch ball 107. This can ensure that the retention protrusions 164*a-b* will not hinder downward movement of the hitch ball 107, which could interfere with a proper measurement of the downward force 151 on the hitch ball 107. The shapes and/or sizes of the retention protrusions 164*a-b* and the retention recesses 163*a-b* can be of any suitable configuration (e.g., cross-sectional shapes that are circular, oval, elliptical, rectangular, etc.), structure (e.g., a notch, a groove, a channel, a hole, etc.), or dimension. For example, the retention protrusions 164*a-b* can comprise at least one of a pin, a bolt, a screw, a rod, a shaft, a tab, a flange, or a ball. In addition, the retention recesses 163*a-b* and the retention protrusions 164*a-b* can be included in any suitable quantity and in any suitable location or pattern. In one example, the retention protrusions 164*a-b* and the retention recesses 163*a-b* can include similar features (e.g., a ball and opening) found in the securing mechanism shown in FIGS. 5B and 5C and described below.

In one aspect, ends of the retention protrusions 164*a-b* can terminate within the retention recesses 163*a-b* (e.g., within the lower portion 162 of the hitch ball 107 or within the body portion 160). In other words, the retention protrusions 164*a-b* do not extend all the way through the hitch ball 107 (e.g., through the lower portion 162) or the body portion 160, as applicable. In a particular aspect, one or more of the retention recesses 163*a-b* can be blind openings or holes (e.g., openings or holes that do not extend all the way through the lower portion 162 of the hitch ball 107 or the body portion 160). Thus, one or more of the retention recesses 163*a-b* can be blind openings or through openings and the retention protrusions 164*a-b* may not extend all the way through the hitch ball 107 or body portion 160.

In one aspect, the lower portion 162 of the hitch ball 107 and the body portion 160 can have a dimensional relationship that results in a relatively "thin-walled" body portion 160 forming the hitch ball opening 161 and surrounding the lower portion 162 of the hitch ball 107. Thus, in some examples, an outer dimension 169*a* of the lower portion 162 of the hitch ball 107 can be greater than or equal to 50% of an outer dimension 169*b* of the body portion 160 about the lower portion 162 of the hitch ball 107.

The weight measuring hitch ball assembly 101 can be adapted to serve as a hitch ball or ball mount for a variety of different hitch configurations. For example, as illustrated in FIG. 2, the attachment structure 117*a* can be a part of or comprise an above-bed attachment structure (e.g., an above-bed gooseneck hitch system). In another example, the attachment structure 117*b* can be any typical vertically-oriented hitch receiver, such as a square hitch receiver (typically aftermarket) or a round hitch receiver (typically OEM) for receiving bed-mount style hitches (e.g., gooseneck hitches). In yet another example, the attachment structure 117*c* can be any typical horizontally-oriented hitch receiver, such as a standard 2½", 2", or 1¼" size square hitch receiver for receiving hitch components (e.g., drawbars) for "bumper pull" style hitches. In another example, the attachment structure 117*d* can be or include a hitch or hitch portion (e.g., a drawbar) configured to interface with another attachment structure 117*e* (e.g., a hitch receiver) integrated with or otherwise attached to a tow vehicle. In one aspect, an attachment structure as disclosed herein can be a portion of the tow vehicle 103, such that the assembly 101 is coupled directly to the tow vehicle 103.

Accordingly, the weight measuring hitch ball assembly 101 can include a hitch mount interface 152 configured to interface with an attachment structure as disclosed herein. In one example, the hitch mount interface 152 can be at least partially defined by the body portion 160. In this case, the body portion 160 can be configured to interface directly with the attachment structure 117*a*. In addition, the hitch mount interface 152 can facilitate coupling with the attachment structure 117*a*, which can be a part of or comprise an above-bed attachment structure (e.g., an above-bed gooseneck hitch system). The hitch mount interface 152 can be located at any suitable location or position on or about the body portion 160. In one aspect, the hitch mount interface 152 can be located at an upper end 166*a* of the body portion 160, a lower end 166*b* of the body portion 160, or both.

In one aspect, the weight measuring hitch ball assembly 101 can include a hitch portion extending from the body portion. The hitch mount interface 152 can be at least partially defined by the hitch portion. Thus, the hitch portion can be configured to interface with an attachment structure as disclosed herein. In one example, a hitch portion 110 can extend downward from the body portion 160 below the hitch ball 107. In this case, the attachment structure 117*b* can comprise a goose ball receiver socket mounted on or otherwise associated with a tow vehicle. In another example, a hitch portion 110' can extend laterally from the body portion 160 on a lateral side of the hitch ball 107. In this case, the attachment structure 117*c* can comprise a hitch receiver. In the above examples, the hitch portions 110, 110' can be permanently attached (e.g., integrally formed) with the body portion 160 or removably coupled to the body portion 160.

The hitch mount interface 152 can be or include any suitable geometry or configuration to facilitate interfacing, coupling, joining, mating, etc. with a given attachment structure. For example, the hitch mount interface 152 can comprise at least one of a planar interface surface or a curved interface surface. In some examples, a planar interface surface can at least partially define a rectangular profile. In some examples, a curved interface surface can at least partially define a circular profile. These aspects of the hitch mount interface 152 are discussed in more detail below.

In one aspect, the hitch mount interface 152 can comprise one or more coupling features operable to facilitate securing the weight measuring hitch ball assembly 101 to a given attachment structure. Such a coupling feature can be or include any suitable coupling configuration known in the art, such as a threaded coupling feature (e.g., external threads or internal threads), a shaft, a rod, a hole, a recess, a groove, a pin, or any other feature suitable for coupling the assembly 101 to an attachment structure and/or a tow vehicle and maintaining structural integrity during towing. In one aspect, a coupling feature as disclosed herein can be associated with the body portion 160 and/or be at least partially defined by the body portion (e.g., an opening, a hole, a stud, etc.). In another aspect, a coupling feature can be associated with a hitch portion. In one example, the hitch portions 110, 110' can include coupling features 112, 112' (e.g., openings, holes, or other suitable features) to facilitate securing the weight measuring hitch ball assembly 101 to the respective attachment structures 117b, 117c. In a particular example, the openings 112, 112' can be operable to receive a pin, rod, or threaded fastener, which can extend through the openings 112, 112' of the assembly 101 and through holes of the respective attachment structures 117b, 117c. In another example, a coupling feature 111 can be operable to couple the ball mount assembly 101 to the attachment structure 117d. In one aspect, the coupling feature 111 can extend downward from the body portion 160 below the hitch ball 107, although any other suitable location and/or orientation of the coupling feature 111 is contemplated. In a particular example, the coupling feature 111 can comprise a threaded coupling feature that extends downward from the body portion 160 below the hitch ball 107. In this case the attachment structure 117d can comprise a hitch or hitch portion (e.g., a draw bar) that can couple with another attachment structure 117e (e.g., hitch receiver) that is associated with a tow vehicle.

One benefit of the coupling feature 111 is that it enables the weight measuring hitch ball assembly 101 to be removably coupled to a given attachment structure 117 (e.g., a hitch or hitch portion, drawbar, hitch receiver, etc.) that is operable to facilitate coupling the assembly 101 to the tow vehicle 103. As will be apparent to one skilled in the art, coupling devices of trailers (e.g., goosenecks, trailer tongues, etc.) have a variety of sizes and can require differing hitch ball sizes to securely couple a trailer to a towing vehicle. Some standard hitch ball sizes can include 1⅞", 2", 2⁵⁄₁₆", and 3" diameters. Thus, an assembly 101 having a suitable ball 138 size can be selected for coupling with a given structure 117 (e.g., a hitch or hitch portion, drawbar, hitch receiver, etc.) to accommodate a given size/configuration of trailer coupling device.

A method of measuring weight of a trailer supported by a tow vehicle can comprise engaging a coupling device of a trailer (e.g., a tongue or a gooseneck) with a weight measuring ball mount assembly as disclosed herein (e.g., the weight measuring ball mount assembly 101), with the weight measuring ball mount assembly being operably coupled to a tow vehicle, such as by an attachment structure associated with the tow vehicle.

The weight measuring hitch ball assembly 101 of FIG. 2 has been shown and described as a generic representation of such an assembly. FIGS. 3A-5C include illustrations of various weight measuring hitch ball assemblies that are more specific examples of the generic weight measuring hitch ball assembly 101 of FIG. 2. Thus, the description of the weight measuring hitch ball assembly 101 in FIG. 2 may describe aspects of the various assemblies of FIGS. 3A-5C, as applicable, which may not be described with particular reference to FIGS. 3A-5C. Furthermore, certain specific aspects and features described in one example may be present in another example, although not specifically discussed with reference to that example.

Figure 3A:
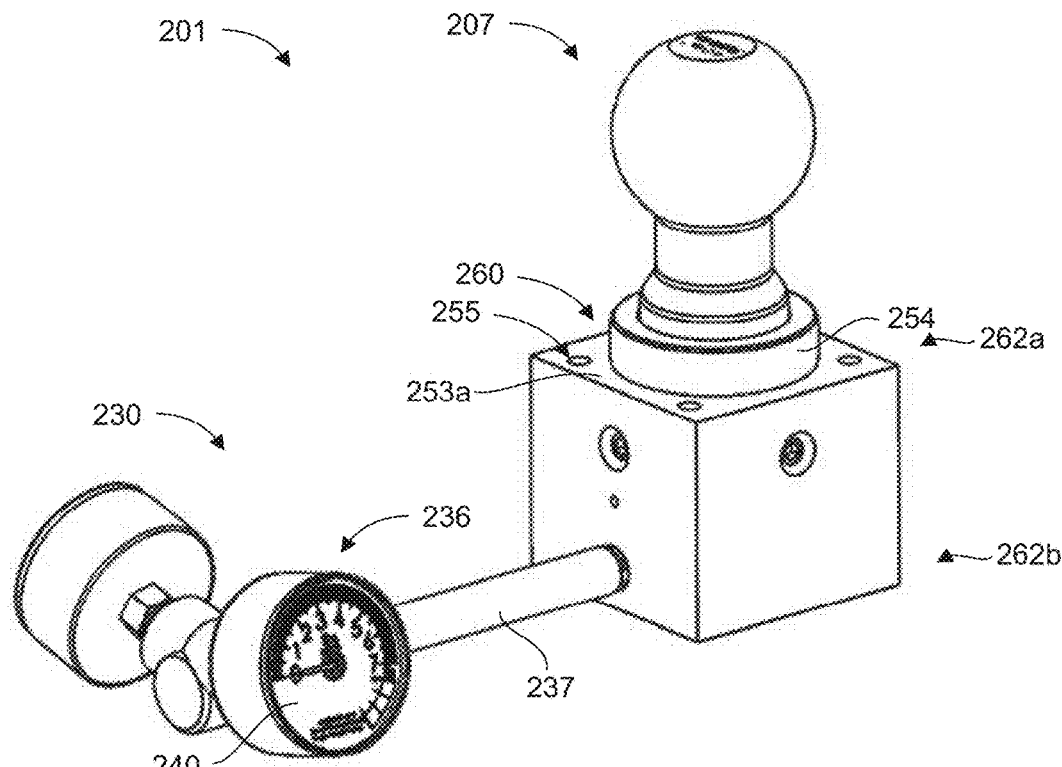
FIGS. 3A and 3B illustrate a weight measuring hitch ball assembly in accordance with an example of the present disclosure.
Figure 3B:
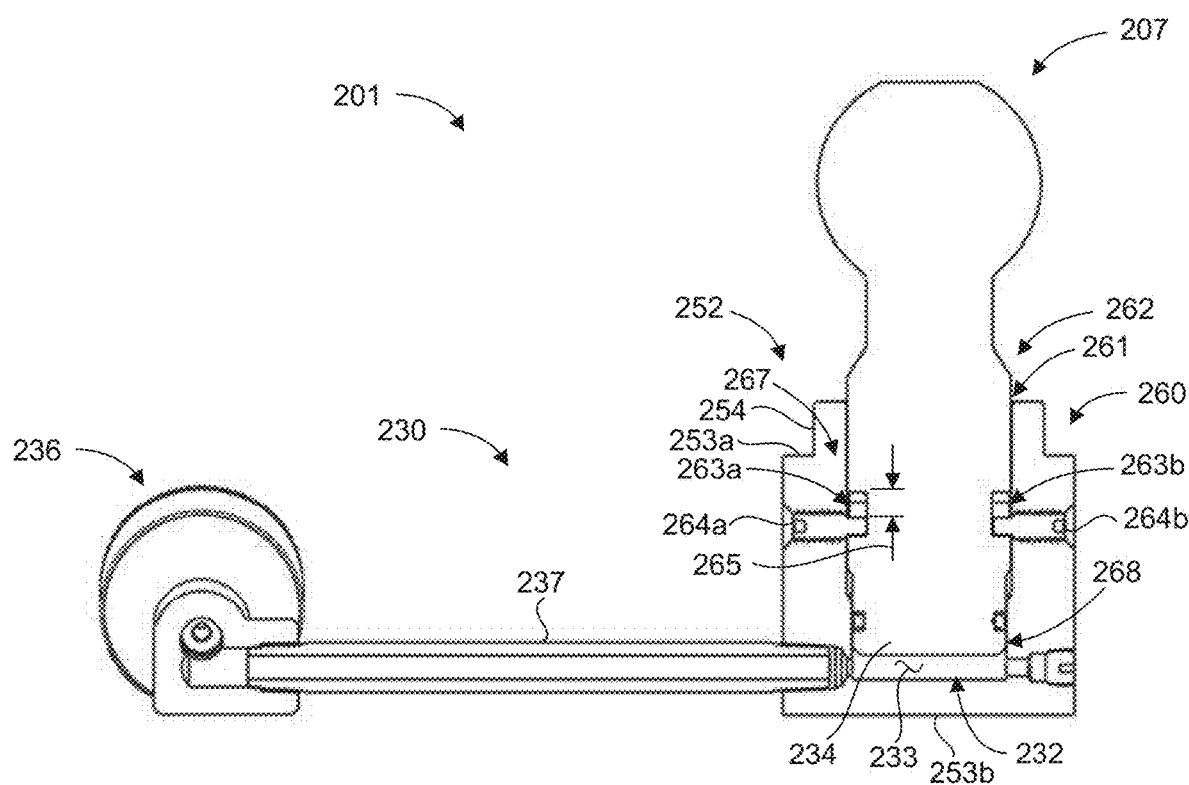

FIGS. 3A and 3B illustrate a weight measuring hitch ball assembly 201 in accordance with an example of the present disclosure. In this example, a load measurement device 230 is illustrated as including a reservoir 232 having a fluid 233 and a piston 234 disposed therein, as shown in FIG. 3B. In this case, the piston 234 is integrally formed with a hitch ball 207 (e.g., a bottom 268 of a lower end 262 of the hitch ball 207 forms the piston 234). The piston 234 can affect a pressure of the fluid 233 as a result of a downward force on the hitch ball 207. The load measurement device 230 also includes a pressure sensor 236, or gauge, in fluid communication with the reservoir 232, such as via a conduit 237, to indicate a quantity of the downward force acting on the hitch ball 207 based on the pressure of the fluid. The pressure sensor 236 can be calibrated to indicate the force acting on the hitch ball 207. Although a particular load measurement device configuration is illustrated, it should be recognized that any suitable load measurement device disclosed herein can be utilized.

In one aspect, a display 240 for the pressure sensor or gauge can be included to indicate the magnitude of the load or downward force acting on the hitch ball 207. Such a display can be located proximate the pressure sensor 236 or included with a gauge. It should be recognized that a pressure sensor, a gauge, or a display can be disposed in any suitable location. For example, as shown in FIGS. 3A and 3B, the pressure sensor 236 and associated display 240 can be located at a distance from the body portion 260. In this case, the pressure sensor 236 can be in fluid communication with the fluid reservoir via the conduit 237 external to the body portion 260. In one aspect, multiple pressure sensors and/or displays can be utilized to present force information in various directions and/or locations.

The weight measuring hitch ball assembly 201 can be configured to capture the hitch ball 207 to prevent the hitch ball from unwanted separation from the body portion 260. For example, as shown in FIG. 3B, the weight measuring hitch ball assembly 201 can include a retention coupling 267 that secures the hitch ball 207 to the body portion 260 while also facilitating slidable movement of the hitch ball 207 within a hitch ball opening 261 of the body portion 260 to determine the magnitude of a force acting on the hitch ball 207.

In the illustrated example, the retention coupling 267 can have one or more retention recesses 263a-b associated with the hitch ball 207 (e.g., formed within the lower portion 262 of the hitch ball 207). The retention coupling 267 can also have one or more retention protrusions 264a-b associated with the body portion 260 (e.g., coupled to the body portion 260). Each of the retention recesses 263a-b can receive at least one of the retention protrusions 264a-b to secure the hitch ball 207 to the body portion 260. For example, the retention protrusions 264a-b can extend into the respective retention recesses 263a-b. The retention recesses 263a-b and the retention protrusions 264a-b can be configured to facilitate movement of the hitch ball 207 against the load measurement device 230 in response to the downward force 251 on the hitch ball. For example, an upper clearance 265 between the retention protrusions 264a-b and the retention recesses 263a-b can be sized equal to or greater than a range of motion of the load measurement device 230 (e.g., maximum deflection or piston travel) in response to a maximum allowable force 251 applied to the hitch ball 207. This can ensure that the retention protrusions 264a-b will not hinder downward movement of the hitch ball 207, which could interfere with a proper measurement of the downward force 251 on the hitch ball 207. The shapes and/or sizes of the retention protrusions 264a-b and the retention recesses 263a-b can be of any suitable configuration (e.g., cross-sectional shapes that are circular, oval, elliptical, rectangular, etc.), structure (e.g., a notch, a groove, a channel, a hole, etc.), or dimension. For example, the retention protrusions 264a-b can comprise at least one of a pin, a bolt, a screw, a rod, a shaft, a tab, a flange, or a ball. In addition, the retention recesses 263a-b and the retention protrusions 264a-b can be included in any suitable quantity and in any suitable location or pattern.

In one aspect, ends of the retention protrusions 264a-b can terminate within the retention recesses 263a-b (e.g., within the lower portion 262 of the hitch ball 207). In other words, the retention protrusions 264*a-b* do not extend all the way through the hitch ball 207 (e.g., through the lower portion 262). In a particular aspect, one or more of the retention recesses 263*a-b* can be blind openings or holes (e.g., openings or holes that do not extend all the way through the lower portion 262 of the hitch ball 207). Thus, one or more of the retention recesses 263*a-b* can be blind openings or through openings and the retention protrusions 264*a-b* may not extend all the way through the hitch ball 207.

Although the retention recesses 263*a-b* have been shown and described as being associated with the hitch ball 207 and the retention protrusions 264*a-b* have been shown and described as being associated with the body portion 260, it should be recognized that retention recesses and retention protrusions can be associated with a hitch ball and/or a body portion, in any suitable arrangement or combination, as desired. For example, retention recesses can be associated with a body portion, and retention protrusions can be associated with a hitch ball. In another example, retention recesses and retention protrusions can be associated with both a hitch ball and a body portion.

Figure 3C:
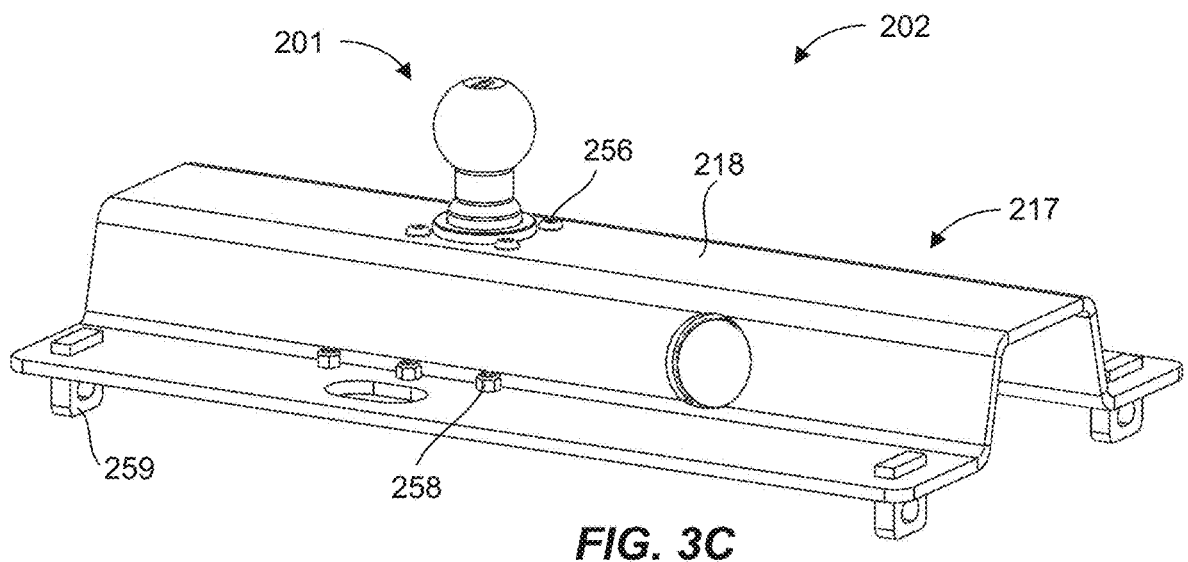
FIGS. 3C-3E illustrate a weight measuring hitch ball system in which the weight measuring ball mount assembly of FIGS. 3A and 3B is incorporated, in accordance with an example of the present disclosure.
Figure 3D:
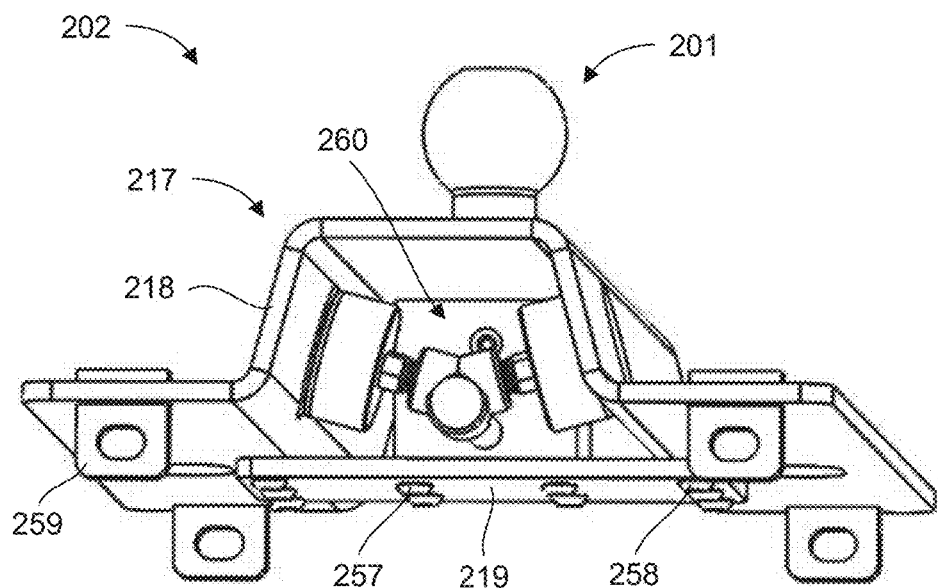
Figure 3E:
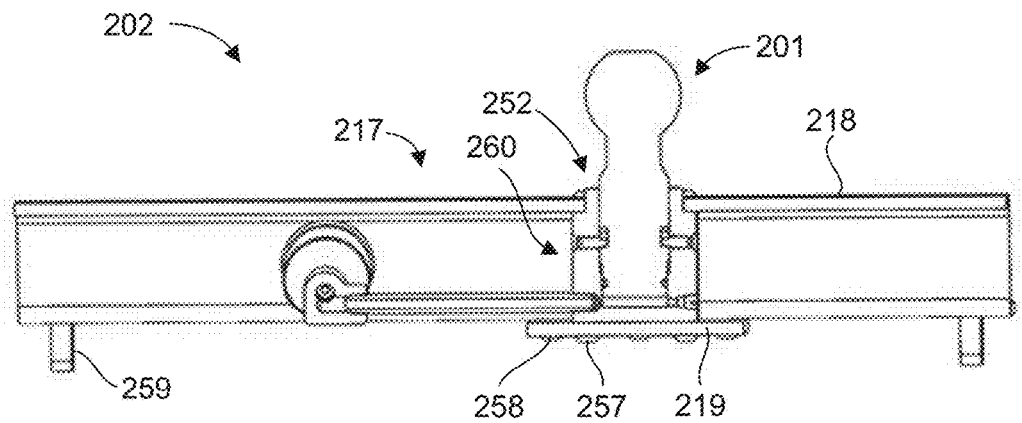
Figure 3F:
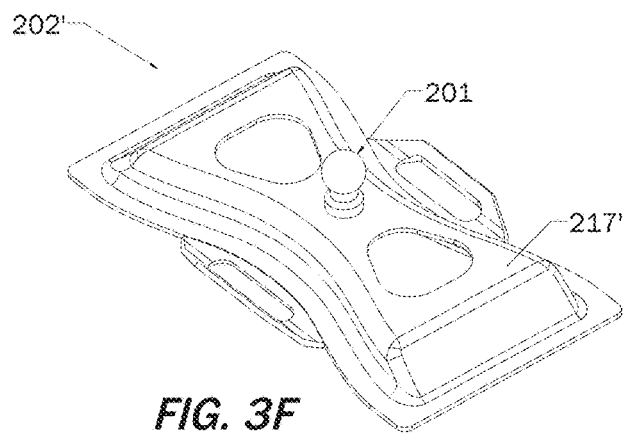
FIG. 3F illustrates a weight measuring hitch ball system in which the weight measuring ball mount assembly of FIGS. 3A and 3B is incorporated, in accordance with an example of the present disclosure.
Figure 3G:
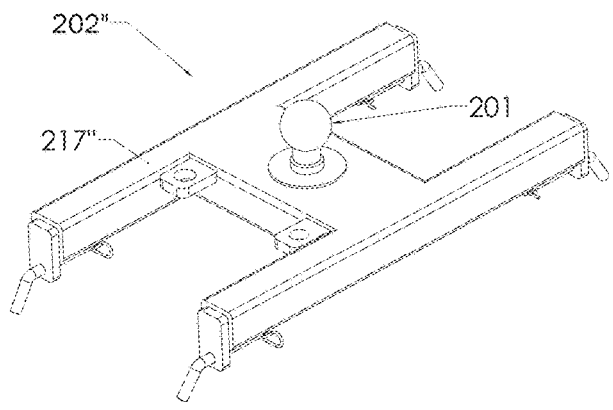
FIG. 3G illustrates a weight measuring hitch ball system in which the weight measuring ball mount assembly of FIGS. 3A and 3B is incorporated, in accordance with an example of the present disclosure.

The weight measuring hitch ball assembly 201 can include a hitch mount interface 252 configured to interface with an attachment structure as disclosed herein. For example, the weight measuring hitch ball assembly 201 can be adapted to interface with and be integrated into a variety of different gooseneck hitch systems, as shown in FIGS. 3C-3G. FIGS. 3C-3E illustrate the weight measuring hitch ball assembly 201 incorporated into an above-bed gooseneck hitch system 202 where the body portion 260 interfaces with an attachment structure 217. FIG. 3F illustrates the weight measuring hitch ball assembly 201 incorporated into an above-bed gooseneck hitch system 202' where the body portion 260 interfaces with an attachment structure 217'. FIG. 3G illustrates the weight measuring hitch ball assembly 201 incorporated into an above-bed gooseneck hitch system 202" where the body portion 260 interfaces with an attachment structure 217". Although above-bed attachment structures are shown in these examples, it should be recognized that the assembly 201 can be adapted to interface with and be integrated into a below-bed gooseneck hitch system.

In one aspect, the hitch mount interface 252 can be at least partially defined by the body portion 260. In this case, the body portion 260 can be configured to interface directly with an above-bed attachment structure 217, 217', 217" as shown in FIGS. 3C-3G. In another aspect, the hitch mount interface 252 can comprise one or more coupling features operable to facilitate securing the weight measuring hitch ball assembly 201 to a given above-bed attachment structure 217, 217', 217" as shown in FIGS. 3C-3G. Such a coupling feature can be or include any suitable coupling configuration known in the art, such as a threaded coupling feature (e.g., external threads or internal threads), a shaft, a rod, a hole, a recess, a groove, a pin, or any other feature suitable for coupling the assembly 201 to an attachment structure and/or a tow vehicle and maintaining structural integrity during towing. In one aspect, a coupling feature as disclosed herein can be associated with the body portion 260 and/or be at least partially defined by the body portion (e.g., an opening, a hole, a stud, etc.). For example, the hitch mount interface 252 can include coupling features 255 (e.g., openings, holes (threaded or otherwise), or other suitable features) to facilitate securing the weight measuring hitch ball assembly 201 to a given above-bed attachment structure 217, 217', 217".

In the example illustrated in FIGS. 3C-3E, the attachment structure 217 can include an upper portion 218 and a lower mounting plate 219. The hitch mount interface 252 can be located at any suitable location or position on or about the body portion 260. In one aspect, the hitch mount interface 252 can be located at an upper end 266*a* of the body portion 260, a lower end 266*b* of the body portion 260, or both, or anywhere in between. For example, the hitch mount interface 252 can comprise at least one of a planar interface surface 253*a-b* or a curved interface surface 254, as shown in FIGS. 3A and 3B. Such interface surfaces can form or be a part of any suitable shape or geometry. For example, the planar interface surfaces 253*a-c* can at least partially define a rectangular profile (e.g., a rectangular cuboid shape) and the curved interface surface 254 can at least partially define a circular profile (e.g., a cylindrical shape). The curved interface surface 254 can be configured to fit within an opening in the upper portion 218 and interface with the upper portion 218. The planar interface surface 253*a* can interface with an underside of the upper portion 218. The top or upper coupling features 255 can be operable to receive a threaded fastener 256 (FIG. 3C) to couple the hitch ball assembly 201 to the upper portion 218. A bottom or lower coupling feature (e.g., an opening or hole (threaded or otherwise) obscured from view) can be operable to receive a threaded fastener 257 (FIGS. 3D and 3F) to couple the hitch ball assembly 201 to the lower mounting plate 219. The lower mounting plate 219 can be coupled to the upper portion 218 with a threaded fastener 258 (FIGS. 3C-3E). The attachment structure 217 can also include a mounting bracket 259, tab, or other such structure operable to couple the attachment structure 217 to a tow vehicle (e.g., a bed of the tow vehicle).

FIGS. 4A-4C illustrate a weight measuring hitch ball assembly 301 in accordance with an example of the present disclosure. As with the weight measuring hitch ball assembly 201 of FIGS. 3A and 3B discussed above, in this example, the weight measuring hitch ball assembly 301 of FIGS. 4A-4C includes a load measurement device 330 with a reservoir 332 having a fluid 333 and a piston 334 integrated with a hitch ball 307 disposed in the reservoir 332, as shown in FIG. 4B. In this case, a pressure sensor 336, or gauge, and associated display 340 are located on, or mounted to, a body portion 360. Although a particular load measurement device configuration is illustrated, it should be recognized that any suitable load measurement device disclosed herein can be utilized.

The weight measuring hitch ball assembly 301 can include a hitch mount interface 352 configured to interface with an attachment structure as disclosed herein. In the illustrated example, the weight measuring hitch ball assembly 301 can include a hitch portion 310 extending downward from the body portion 360 below the hitch ball 307. The hitch portion 310 can be permanently attached (e.g., integrally formed) with the body portion 360 or removably coupled to the body portion 360. The hitch mount interface 352 can be at least partially defined by the hitch portion 310. Thus, the hitch portion 310 can be configured to interface with an attachment structure as disclosed herein. In this example, an attachment structure 317 can comprise a goose ball receiver socket mounted on (e.g., below-bed) or otherwise associated with a tow vehicle. Thus, the hitch portion 310 can be adapted to interface with an attachment structure 317 configured as a goose ball receiver socket mounted on (e.g., below-bed) or otherwise associated with a tow vehicle. In particular, the hitch portion 310 comprises a rectangular cuboid configuration, which may be sized and configured to fit within a given below-bed attachment structure. A typical cross-sectional size for the hitch portion 310 may be a 2-inch by 2-inch square.

The hitch mount interface 352 can be or include any suitable geometry or configuration to facilitate interfacing, coupling, joining, mating, etc. with a given attachment structure. For example, the hitch mount interface 352 can comprise at least one of a planar interface surface 353 or a curved interface surface. In some examples, the planar interface surface 353 can at least partially define a rectangular profile. In some examples, a curved interface surface can at least partially define a circular profile.

In one aspect, the hitch mount interface 352 can comprise one or more coupling features 312 operable to facilitate securing the weight measuring hitch ball assembly 301 to the attachment structure 317. Such a coupling feature can be or include any suitable coupling configuration known in the art, such as a threaded coupling feature (e.g., external threads or internal threads), a shaft, a rod, a hole, a recess, a groove, a pin, or any other feature suitable for coupling the assembly 301 to the attachment structure 317 and/or a tow vehicle and maintaining structural integrity during towing. In one aspect, the coupling feature 312 can be associated with the hitch portion 310. In one example, the hitch portion 310 can include coupling features 312 (e.g., openings, holes, or other suitable features) to facilitate securing the weight measuring hitch ball assembly 301 to the attachment structure 317. In a particular example, the opening 312 can be operable to receive a pin, rod, shaft, or threaded fastener 315, which can extend through the openings 312 of the hitch portion 310 and through similar openings or holes 316 of the attachment structure 317 aligned with the opening 312.

The top cross-sectional view of FIG. 4C further illustrates an arrangement of retention recesses 363a-d and the retention protrusions 364a-d that serve to secure the hitch ball 307 to the body portion 360. In this case, four retention protrusions 364a-d extend into four respective retention recesses 363a-d, which are equally spaced about the circumference of the body portion 360 and the hitch ball 307, although any suitable configuration may be utilized.

Figure 5A:
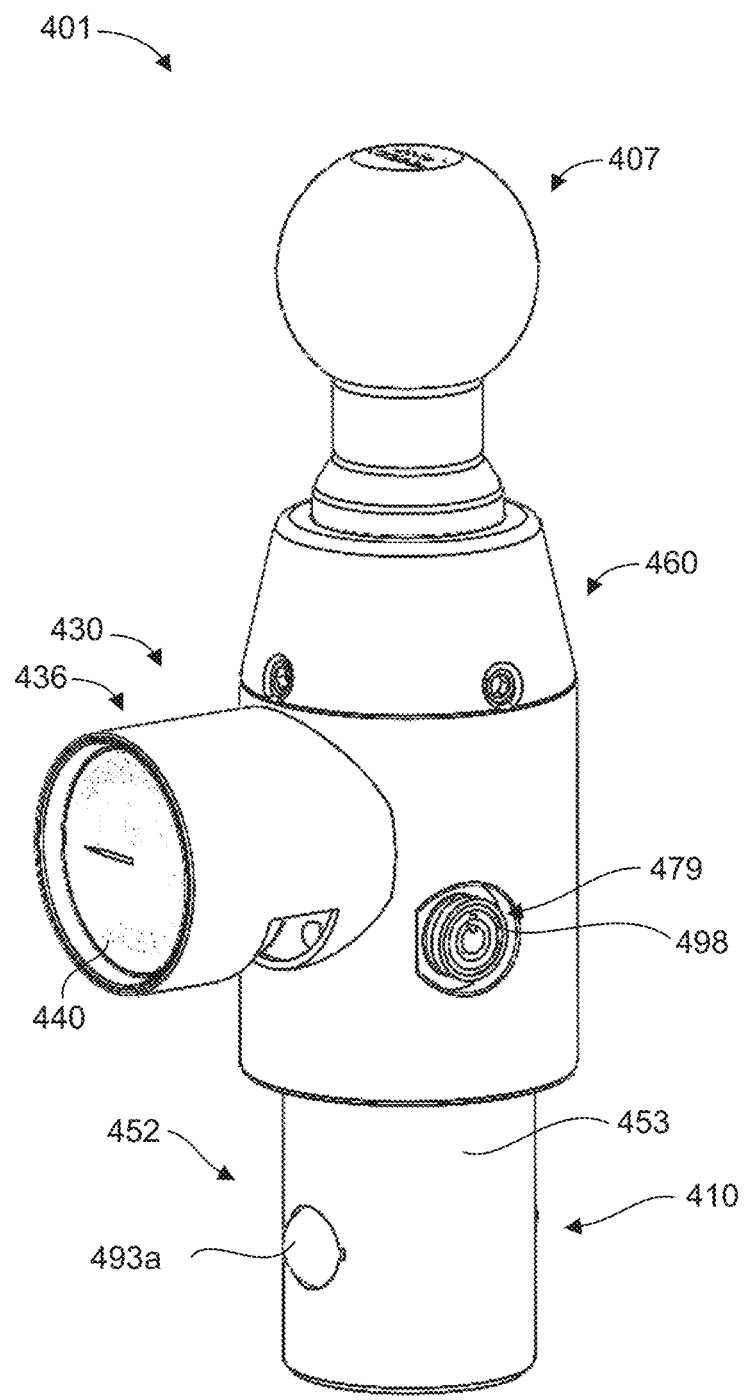
FIG. 5A illustrate a weight measuring hitch ball assembly in accordance with an example of the present disclosure.
Figure 5B:
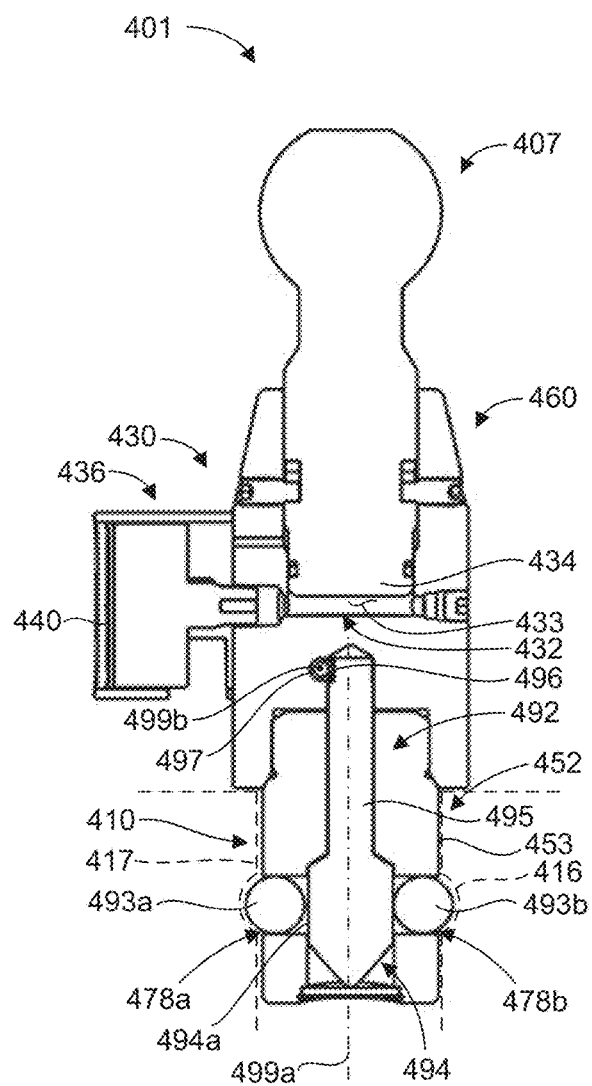
FIGS. 5B and 5C are side cross-sectional views of the weight measuring hitch ball assembly of FIG. 5A.
Figure 5C:
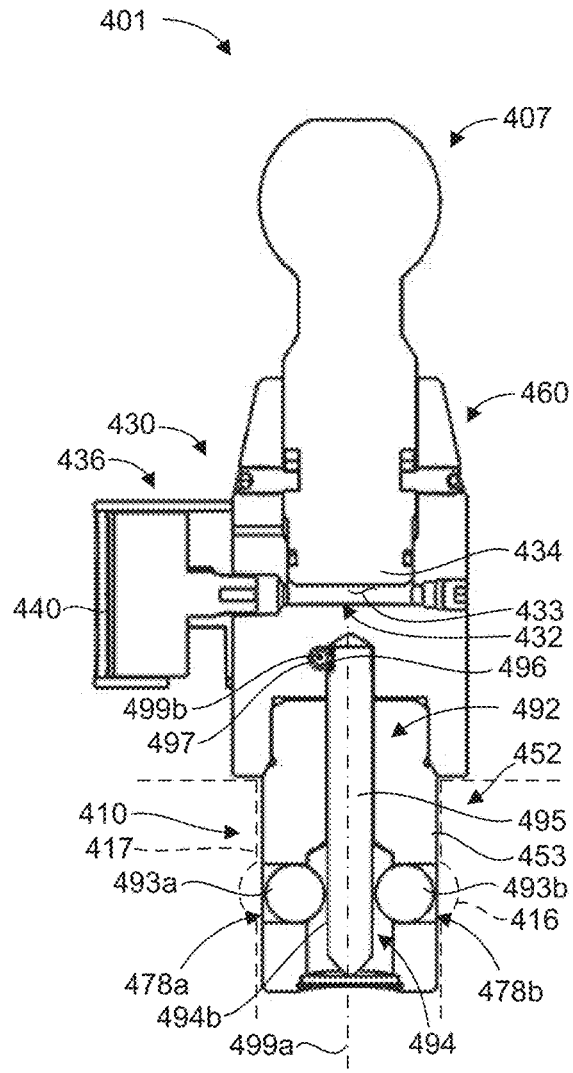

FIGS. 5A-5C illustrate a weight measuring hitch ball assembly 401 in accordance with an example of the present disclosure. As with other weight measuring hitch ball assemblies discussed above, in this example, the weight measuring hitch ball assembly 401 includes a load measurement device 430 with a reservoir 432 having a fluid 433 and a piston 434 integrated with a hitch ball 407 disposed in the reservoir 432, as shown in FIGS. 5A and 5B. In this case, a pressure sensor 436, or gauge, and associated display 440 are located on, or mounted to, a body portion 460. Although a particular load measurement device configuration is illustrated, it should be recognized that any suitable load measurement device disclosed herein can be utilized.

The weight measuring hitch ball assembly 401 can include a hitch mount interface 452 configured to interface with an attachment structure as disclosed herein. In the illustrated example, the weight measuring hitch ball assembly 401 can include a hitch portion 410 extending downward from the body portion 460 below the hitch ball 407. The hitch portion 410 can be permanently attached (e.g., integrally formed) with the body portion 460 or removably coupled to the body portion 460. The hitch mount interface 452 can be at least partially defined by the hitch portion 410. Thus, the hitch portion 410 can be configured to interface with an attachment structure as disclosed herein. In this example, an attachment structure 417 can comprise a goose ball receiver socket mounted on (e.g., below-bed) or otherwise associated with a tow vehicle. Thus, the hitch portion 310 can be adapted to interface with an attachment structure 317 configured as a goose ball receiver socket mounted on (e.g., below-bed) or otherwise associated with a tow vehicle. In this case, the hitch portion 410 comprises a cylindrical configuration (e.g., a circular cross-section), which may be sized and configured to fit within a given below-bed attachment structure. Such a configuration is typically associated with OEM-type goose ball hitch attachment structures.

The hitch mount interface 452 can be or include any suitable geometry or configuration to facilitate interfacing, coupling, joining, mating, etc. with a given attachment structure. For example, the hitch mount interface 452 can comprise at least one of a planar interface surface or a curved interface surface 453. In some examples, a planar interface surface can at least partially define a rectangular profile. In some examples, the curved interface surface 453 can at least partially define a circular profile (e.g., a cylindrical shape).

In one aspect, the hitch mount interface 452 can comprise a coupling feature operable to facilitate securing the weight measuring hitch ball assembly 401 to the attachment structure 417. OEM-type goose ball hitch attachment structures typically utilize a radiused or semicircular-shaped groove 416 configured to receive and interface with one or more balls 493a-b extending laterally from the hitch portion 410, as shown in FIG. 5B. Accordingly, in one aspect, the hitch mount interface 452 coupling feature can comprise a securing mechanism 492 operable to secure the assembly 401 to a suitable attachment structure 417. For example, the coupling feature or securing mechanism 492 can include a movable ball 493a-b operable to extend into the groove 416 in the attachment feature 417 to secure the weight measuring hitch ball assembly 401 to the attachment feature 417 and to retract from the groove 416 to facilitate removal of the weight measuring hitch ball assembly 401 from the attachment feature 417. The balls 493a-b can be laterally movable within respective openings 478a-b in the hitch portion 410. The ball 493 can be operable to engage the attachment structure 417 (e.g., via a radiused or semicircular-shaped groove 416). The securing mechanism 492 can also include a cam 494 operable to maintain the balls 493a-b laterally outward in a secured position (FIG. 5B) or allow movement of the ball 493 laterally inward in a release position (FIG. 5C). The cam 494 can include a wide portion 494a configured to contact the balls 493a-b and maintain the balls in the outward, secured position. The cam 494 can also include a narrow portion 494b that is configured to allow the balls to retract inward in the release position. The secured and release positions can be achieved by a 90-degree rotation of the cam 494.

In one aspect, the securing mechanism 492 can include a shaft 495 coupled to and extending from the cam 494, a gear 496 associated with the shaft 495, and a gear 497 operably coupled to the gear 496. In one aspect, the gears 496, 497 can be located in, and supported by, a body portion 460 of the weight measuring hitch ball assembly 401. The gear 497 can be associated with a user interface 498 (FIG. 5A) to operate the cam 494. At least one of the gear 496 or the gear 497 can be rotatable to operate the cam 494. For example, as shown in FIGS. 5B and 5C, the gear 496 can be a spur gear rotatable about a longitudinal axis 499a of the shaft 495 and the gear 497 can be a worm gear rotatable about an axis 499b oriented non-parallel (e.g., perpendicular) to the longitudinal axis 499a of the shaft 495. In another example, the gear 496 can be a pinion gear rotatable about the longitudinal axis 499a of the shaft 495, and the gear 497 can be a rack gear translatable in a direction non-parallel (e.g., perpendicular) to the longitudinal axis 499a of the shaft 495. In this case, the cam 494 can be actuated by a press type (e.g., button) user interface.

In one aspect, the securing mechanism 492 can include a locking mechanism 479 (e.g., a lock core) operable to alternately lock and release the gear 497 when the cam 494 is in the secured position to prevent unwanted release of the weight measuring hitch ball assembly 401 from the attachment structure. In one aspect, the user interface 498 can comprise an engagement feature for a key to the locking mechanism 479.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A weight measuring hitch ball assembly, comprising:
a hitch ball having a ball and a lower portion;
a body portion defining a hitch ball opening that slidably receives the lower portion of the hitch ball;
a load measurement device operably associated with the body portion and the hitch ball to determine a magnitude of a force acting on the hitch ball; and
a hitch mount interface, configured to interface with an attachment structure that facilitates coupling the weight measuring hitch ball assembly to a tow vehicle,
wherein the hitch mount interface comprises a coupling feature operable to facilitate securing the weight measuring hitch ball assembly to the attachment structure,
wherein the coupling feature comprises a movable ball operable to extend into a groove in the attachment structure to secure the weight measuring hitch ball assembly to the attachment structure and to retract from the groove to facilitate removal of the weight measuring hitch ball assembly from the attachment structure.

2. The weight measuring hitch ball assembly of claim 1, wherein the hitch mount interface is at least partially defined by the body portion.

3. The weight measuring hitch ball assembly of claim 2, wherein the hitch mount interface is located at a lower end of the body portion.

4. The weight measuring hitch ball assembly of claim 1, wherein the coupling feature is associated with the body portion.

5. The weight measuring hitch ball assembly of claim 4, wherein the coupling feature is at least partially defined by the body portion.

6. The weight measuring hitch ball assembly of claim 4, wherein the coupling feature extends downward from the body portion below the hitch ball.

7. The weight measuring hitch ball assembly of claim 1, wherein the coupling feature comprises a threaded coupling feature.

8. The weight measuring hitch ball assembly of claim 1, wherein the coupling feature comprises an opening operable to receive a pin or a rod.

9. The weight measuring hitch ball assembly of claim 1, further comprising a hitch portion extending from the body portion, wherein the hitch mount interface is at least partially defined by the hitch portion.

10. The weight measuring hitch ball assembly of claim 9, wherein the hitch portion extends downward from the body portion below the hitch ball.

11. The weight measuring hitch ball assembly of claim 9, wherein the hitch portion extends laterally from the body portion on a lateral side of the hitch ball.

12. The weight measuring hitch ball assembly of claim 1, wherein the hitch mount interface comprises at least one of a planar interface surface or a curved interface surface.

13. The weight measuring hitch ball assembly of claim 12, wherein the planar interface surface at least partially defines a rectangular profile.

14. The weight measuring hitch ball assembly of claim 12, wherein the curved interface surface at least partially defines a circular profile.

15. A weight measuring hitch ball system, comprising:
the weight measuring hitch ball assembly of claim 1; and
the attachment structure.

16. The system of claim 15, wherein the hitch mount interface is at least partially defined by the body portion, and the attachment structure is an above-bed attachment structure.

17. The system of claim 16, wherein the hitch mount interface is located at a lower end of the body portion.

18. The system of claim 15, wherein the hitch mount interface comprises a coupling feature operable to facilitate securing the weight measuring hitch ball assembly to the tow vehicle.

19. The system of claim 18, wherein the coupling feature is associated with the body portion.

20. The system of claim 19, wherein the coupling feature is at least partially defined by the body portion.

21. The system of claim 19, wherein the coupling feature comprises a threaded coupling feature that extends downward from the body portion below the hitch ball, and the attachment structure comprises a draw bar.

22. The system of claim 18, wherein the coupling feature comprises a threaded coupling feature.

23. The system of claim 18, wherein the coupling feature comprises an opening operable to receive a pin or a rod.

24. The system of claim 18, wherein the coupling feature comprises a movable ball operable to extend into a groove in the attachment structure to secure the weight measuring hitch ball assembly to the attachment structure and to retract from the groove to facilitate removal of the weight measuring hitch ball assembly from the attachment structure.

25. The system of claim 15, further comprising a hitch portion extending from the body portion, wherein the hitch mount interface is at least partially defined by the hitch portion.

26. The system of claim 25, wherein the hitch portion extends downward from the body portion below the hitch ball, and the attachment structure comprises a goose ball receiver socket.

27. The system of claim 25, wherein the hitch portion extends laterally from the body portion on a lateral side of the hitch ball, and the attachment structure comprises a hitch receiver.

28. The system of claim 15, wherein the hitch mount interface comprises at least one of a planar interface surface or a cylindrical interface surface.

29. A method of measuring weight of a trailer supported by a tow vehicle, comprising:
    engaging a coupling device of a trailer with the weight measuring hitch ball assembly of claim 1, the weight measuring hitch ball assembly being operably coupled to the tow vehicle.

\* \* \* \* \*